Oct. 25, 1927.
B. E. TAYLOR
1,646,715
STERILIZING APPARATUS
Filed Dec. 7, 1926
6 Sheets-Sheet 4
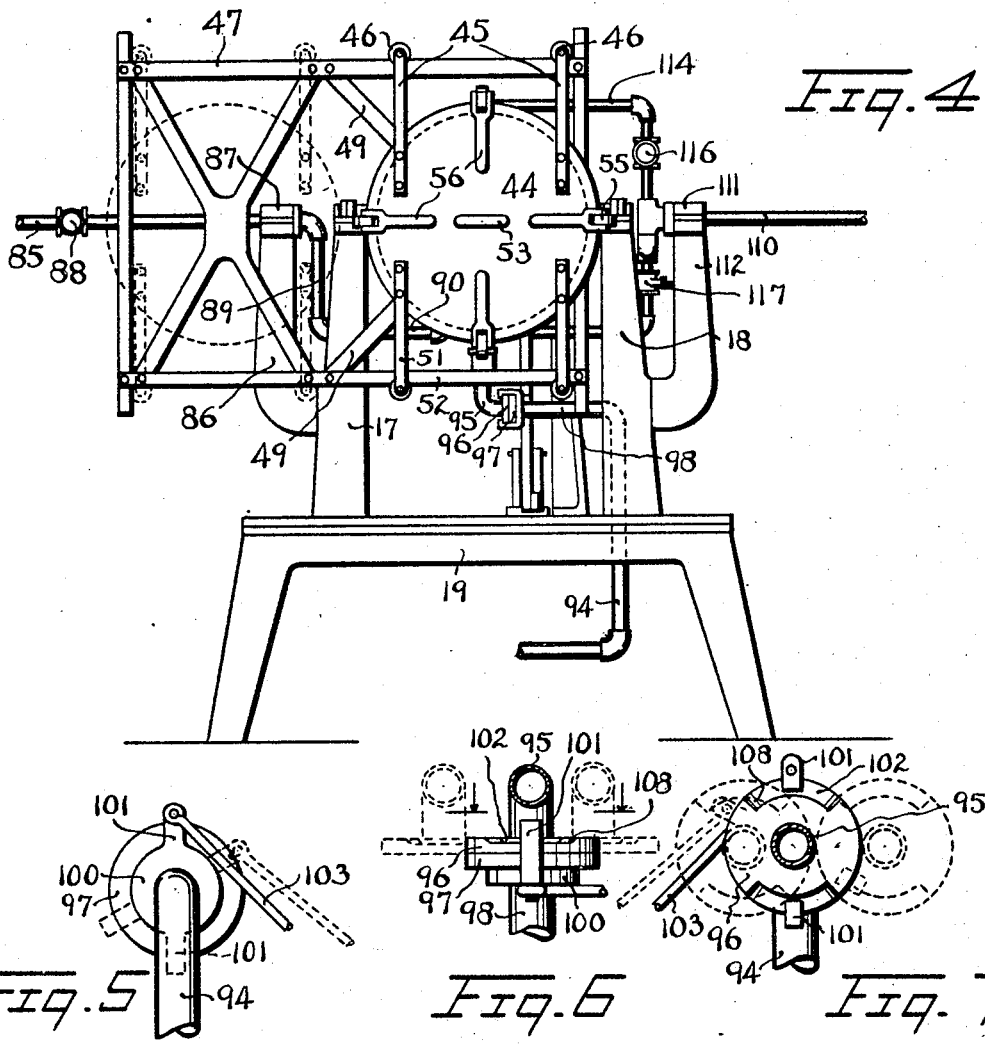
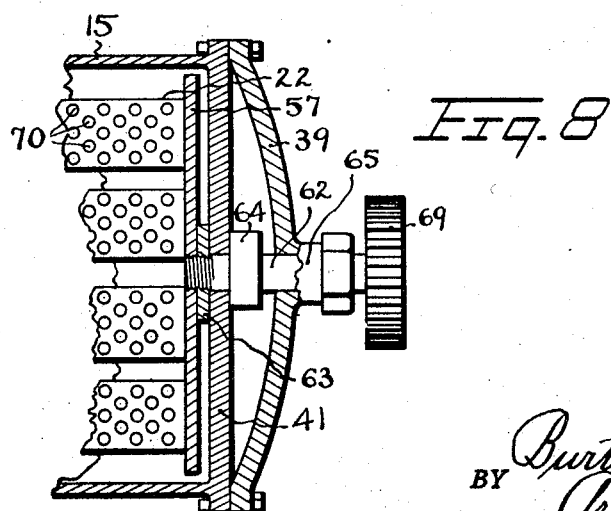

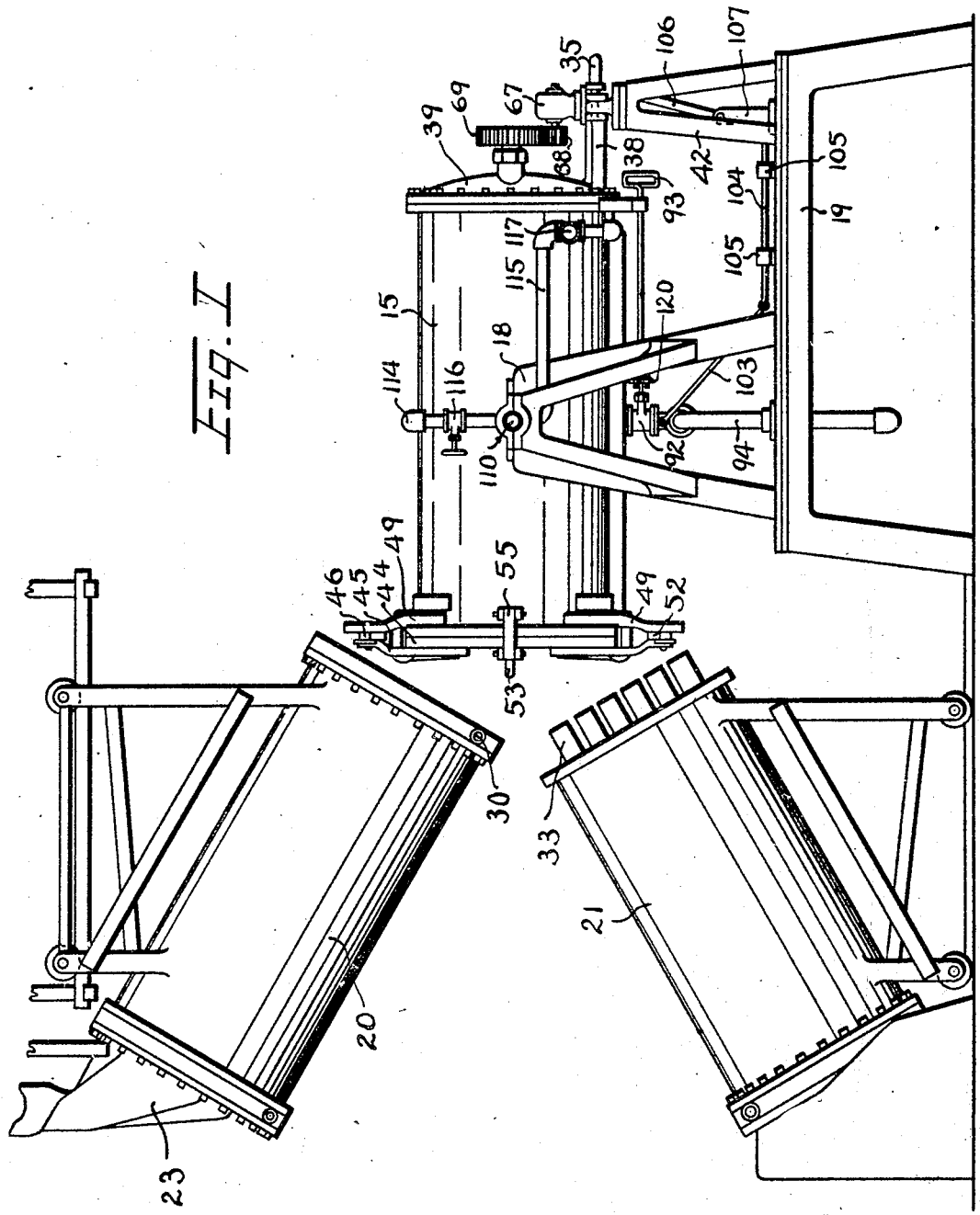

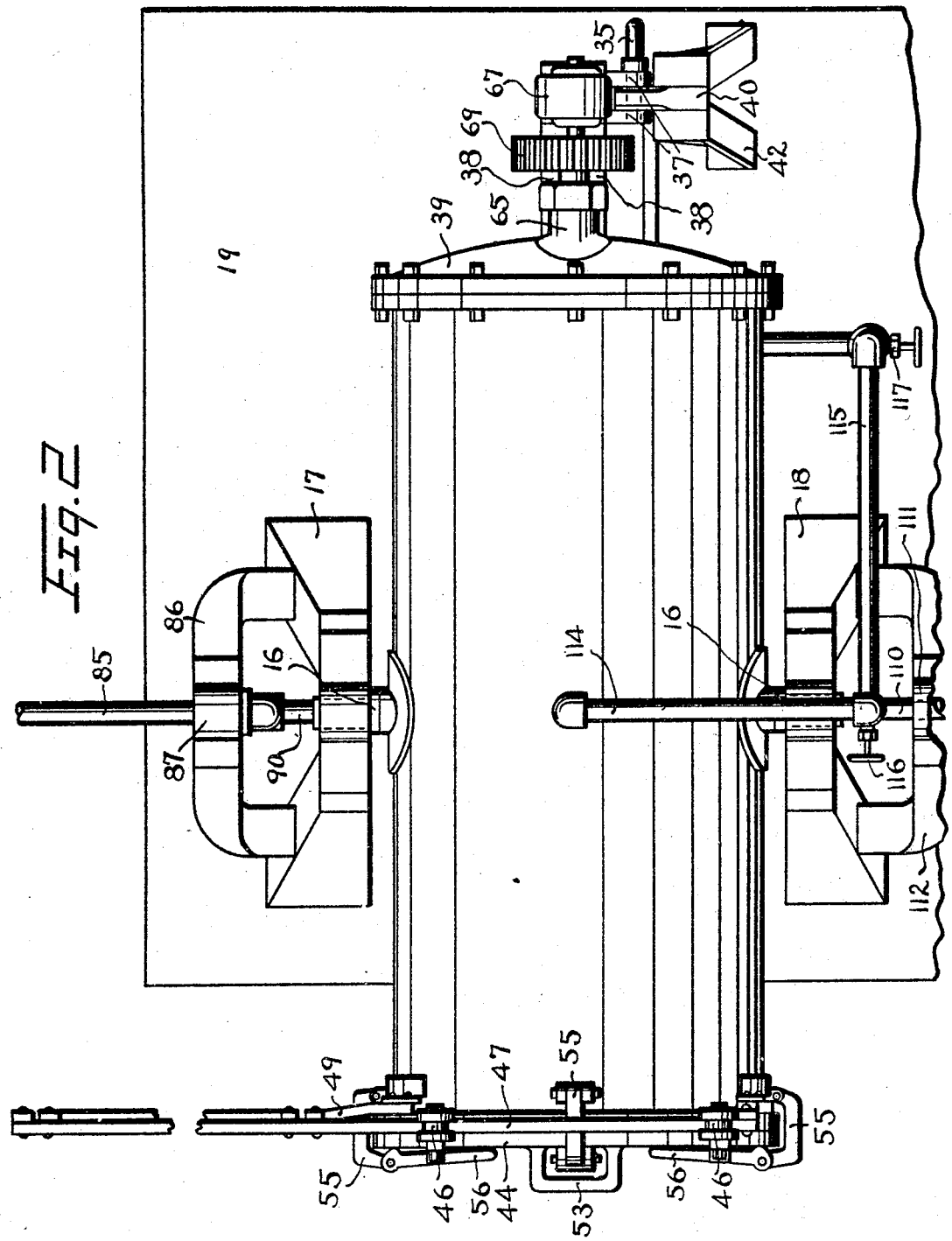

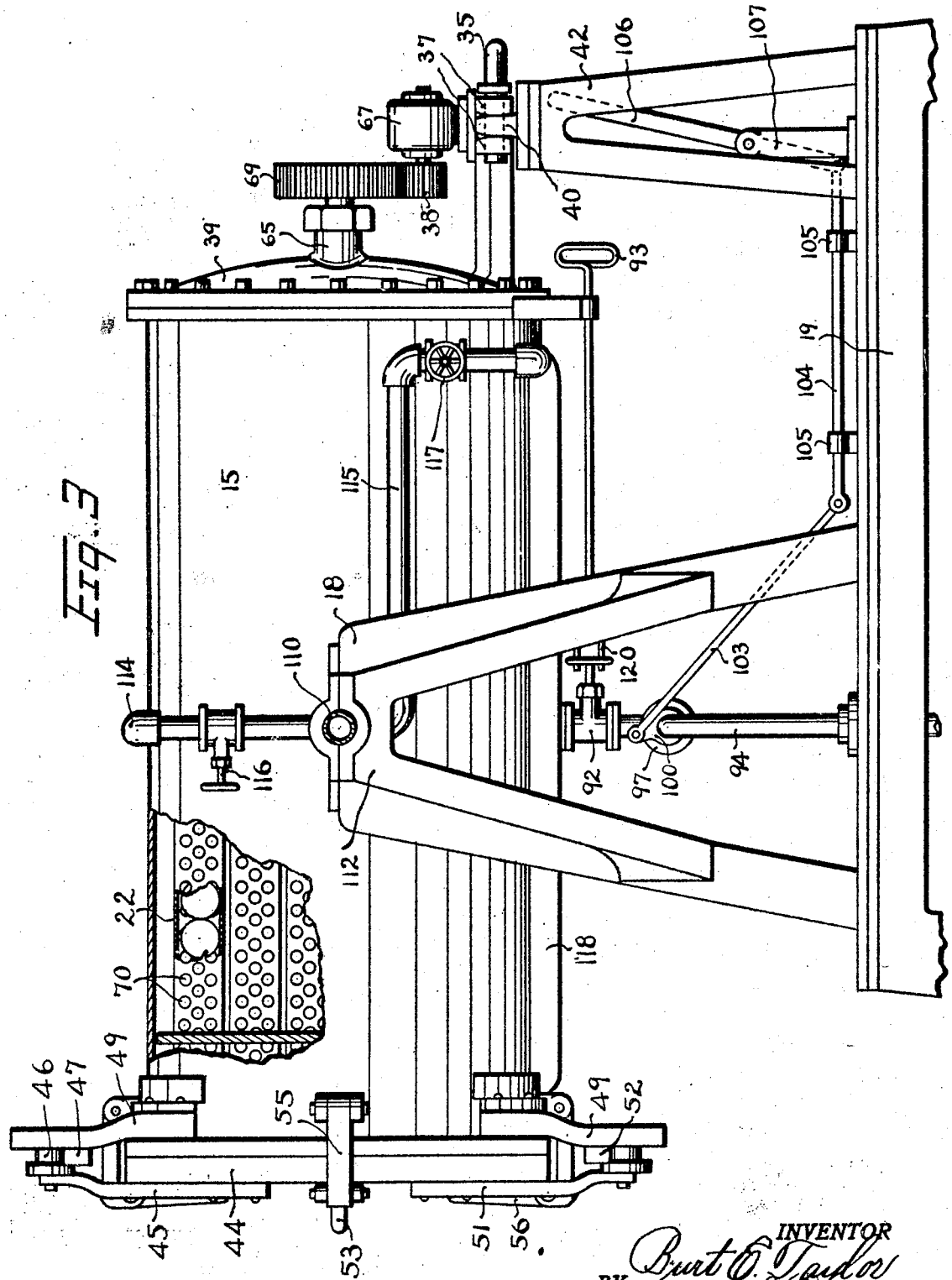

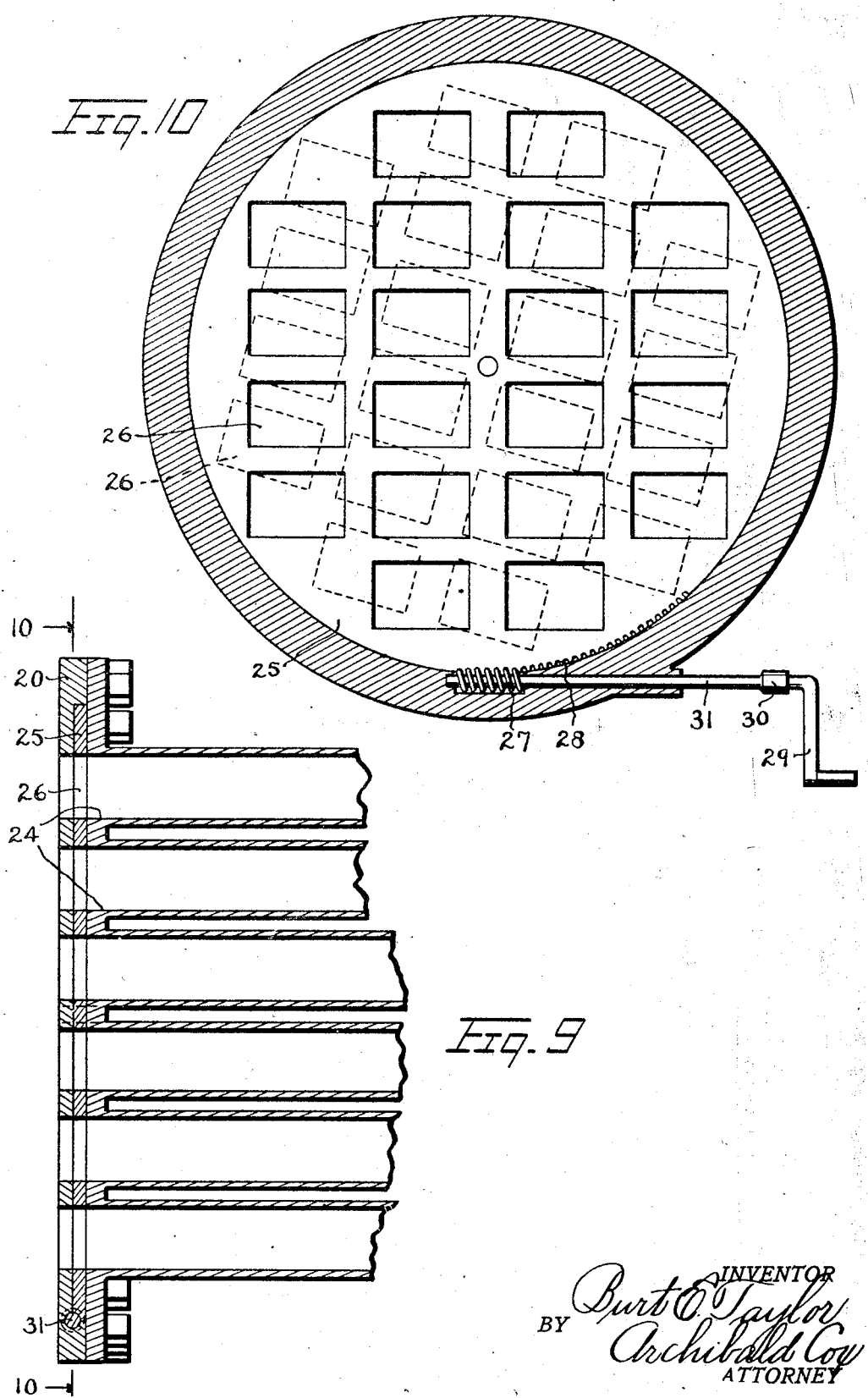

Oct. 25, 1927.  
B. E. TAYLOR  
STERILIZING APPARATUS  
Filed Dec. 7, 1926
1,646,715
6 Sheets-Sheet 6
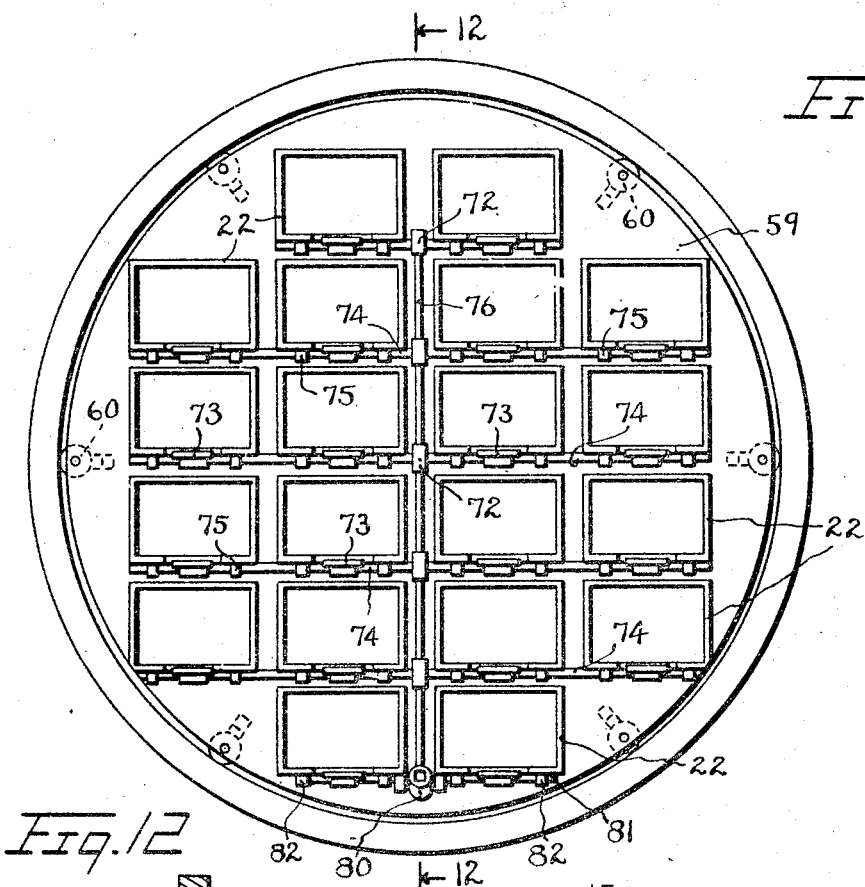
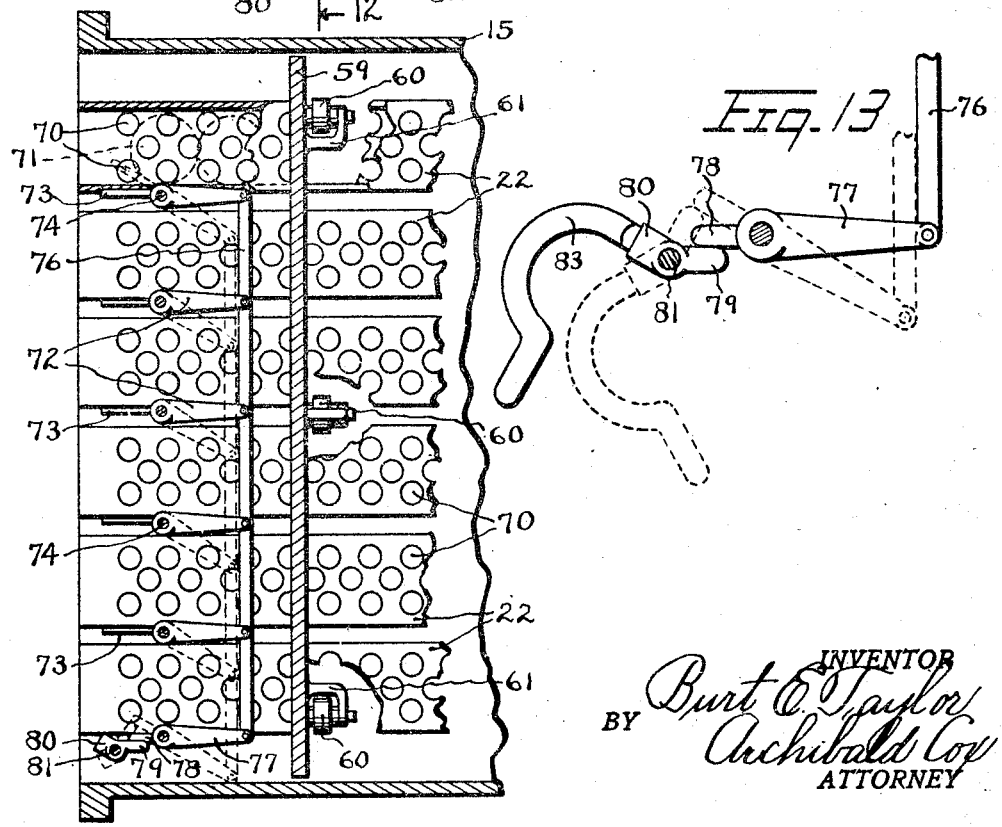
INVENTOR  
Burt E. Taylor  
BY Archibald Cox  
ATTORNEY Patented Oct. 25, 1927.

1,646,715

UNITED STATES PATENT OFFICE.

BURT E. TAYLOR, OF MOUNT VERNON, NEW YORK, ASSIGNOR TO THE BORDEN COMPANY, OF NEW YORK, N. Y., A CORPORATION OF NEW JERSEY.

STERILIZING APPARATUS.

Original application filed January 28, 1926, Serial No. 84,305. Divided and this application filed December 7, 1926. Serial No. 153,109.

The invention relates to an improvement in sterilizing apparatus, and more particularly to an improvement in apparatus especially adapted for sterilizing food products such as evaporated milk put up in hermetically sealed cans. The present application is a division of my copending application Serial No. 84,305, filed January 28, 1926. This application is directed specifically to the novel sterilizer shown and described but not claimed in my said application.

The preferred form of sterilizer embodying invention is illustrated in the accompanying drawings in which Fig. 1 is a side elevation of the improved sterilizer, showing the magazine for charging the sterilizer with the articles to be sterilized and the magazine for receiving the sterilized articles; Fig. 2 is an enlarged top plan of the sterilizer, shown at the right in Fig. 1; Fig. 3 is a side elevation, partly in section, of the parts shown in Fig. 2; Fig. 4 is a front elevation of the sterilizer on the scale of Fig. 1; Figs. 5, 6 and 7 are, respectively, a rear elevation, a top plan and a front elevation of the detachable drain pipe connection; Fig. 8 is a section though the rear end of the sterilizer, showing the method of mounting the rear end of the rotary spider in the shell of the sterilizer; Fig. 9 is a longitudinal section on an enlarged scale through the discharge end of the charging magazine; Fig. 10 is a section taken along the line 10—10 of Fig. 9; Fig. 11 is a front elevation of the sterilizer, with the cover removed; Fig. 12 is a section taken along the line 12—12 of Fig. 11; and Fig. 13 is a detail of the arm and wrench for manipulating the stop fingers at the front end of the sterilizer.

The improved sterilizing apparatus comprises a sterilizer or retort 15 in which the articles are sterilized. The sterilizer 15 is provided with the horizontal trunnions 16 journaled in the upper ends of the uprights 17 and 18 rising from the table 19 so as to swing in a vertical plane, upwardly to receive the charge of articles to be sterilized from the charging magazine 20, and downwardly to discharge the sterilized articles into the receiving magazine 21. The construction and mode of operation of the charging magazine 20 and the receiving magazine 21 are fully described in my said application. The magazines are mounted to be moved up to and away from the sterilizer for the charging and discharging operations. It is assumed that the articles to be sterilized are cylindrical tin cans such as are used for containing evaporated milk and other preserved food products. The sterilizer 15 is provided with rows or tiers of longitudinally arranged tubes 22 for holding the cans during the sterilizing operation, and the charging magazine and the receiving magazine are provided with correspondingly arranged longitudinal tubes as a convenient method of charging the sterilizer and receiving the sterilized cans. The cans to be sterilized are fed into the charging magazine 20 from a hopper 23. While the magazine 20 is being filled with cans and until the sterilizer 15 is in position to receive the cans the lower ends of the longitudinal tubes 24 in the magazine 20 are closed by a plate 25 rotatably mounted in the lower end of the magazine. In the plate 25 are openings 26 which are brought into alinement with the tubes 24 when the sterilizer 15 is tilted upwardly and the magazine 20 moved into engagement therewith. For this purpose the lower end of the magazine is provided with a worm 27 engaging the teeth 28 on the plate 25. The worm 27 is actuated to rotate the plate 25 to move the openings 26 into alinement with the tubes 24 by means of a handle 29 adapted to be inserted into a socket 30 in the end of the shaft 31 on which the worm 27 is mounted. On the completion of the sterilizing operation the sterilizer 15 is tilted downwardly so that the open forward ends of the tubes 33 of the receiving magazine 21 may be moved into alinement with the open ends of the tubes 22 in the retort.

The sterilizer or retort 15 comprises a cylindrical shell and the trunnions 16 are secured to the sides thereof at substantially the middle points. The sterilizing operation is carried on while the sterilizer is in its horizontal position, in which position it is held by means of a pin 35 which passes through an alined hole in the bifurcated projection 37 of a platform 38 extending outwardly from the rear cover 39 of the sterilizer and an arm 40 extending laterally from the upper end of a standard 42 supported on the table 19. The sides of the slot in the projection 37 and the sides of the arm 40 are convex so that the projection 37 may swing clear of the arm 40 both downwardly and upwardly when the sterilizer is tilted to its can receiving and to its can discharging positions.

The rear end of the cylindrical shell of the sterilizer 15 is closed by an inner or false cover 41 (Fig. 8). The forward end of the sterilizer is closed during the sterilizing operation by means of a cover 44 which is so mounted that it may be slid out of the way when the sterilizer is to be tilted into its can receiving and can discharging positions. For this purpose the cover 44, which is substantially a disk in shape, is provided with two upwardly extending arms 45 on the upper ends of which are mounted the rollers or wheels 46 arranged to travel on the runway 47 which is the upper horizontal piece of a frame work supported from the forward end of the shell of the sterilizer by the brackets 49. Two downwardly projecting arms 51 provided at their lower ends with rollers or wheels which engage with the lower horizontal bar or runway 52 assist in guiding the cover 44 as it is slid away from and returned to the open front end of the sterilizer. The cover 44 is provided with a forwardly extending handle 53 by which it may be moved by the operator. It will be observed that the above described construction is such that the frame work and the cover 44 swing upwardly with the sterilizer into can receiving position and downwardly with the sterilizer into can discharging position.

The cover 44 is held in position on the front end of the sterilizer during the sterilizing operation by means of four equally-spaced clamps 55 mounted on the front end of the shell of the sterilizer, and provided with the operating handles 56. These clamps are of usual construction and mode of operation.

In order to effect a thorough sterilization of the contents of all the cans in the sterilizer the cans are so positioned and held in the sterilizer that they are all uniformly subjected to the sterilizing medium. The sterilizing operation is made more effective by causing the batch of cans in the sterilizer to rotate as a whole. To secure these ends the sterilizer is provided with a rotatably mounted magazine, or spider, as it is termed in the art. This spider comprises the series of longitudinally disposed tubes or chambers 22 which are rectangular in cross-section and extend throughout the length of the sterilizer. By reference to Fig. 11 it will be seen that there are four tiers of these elongated tubes 22, the two lateral tiers consisting of four tubes each and the two middle tiers consisting of six tubes each. These tubes pass through and are supported at intervals throughout the length of the sterilizer by means of the disk-like plates 59 (Fig. 12), only one of which is indicated. The periphery of each plate 59 is provided with a series of equally spaced rolls 60 journaled in the plate and in the brackets 61 supported therefrom, and bearing against the interior periphery of the cylindrical shell of the sterilizer. The rear ends of the tubes 22 are secured to a circular plate 57 into the center of which is screwed the inner end of a shaft 62 journaled in the center of the covers 39 and 41 of the sterilizer. The inner end of the shaft 62 is held in the center of the plate 57 and in the washer 63 (which separates the plate 57 from the inner cover 41) by means of a collar 64 pinned or otherwise secured to the shaft 62. A stuffing box 65 threaded onto the outer end of the shaft 62 and bearing against the central hub-like part of the cover 39 prevents leakage and aids in holding the shaft 62 in operative position. Inasmuch as the plate 57 is supported by the inner end of the shaft 62 it is unprovided with rolls. Power is supplied to rotate the can supporting spider by the motor 67 supported on the outer end of the platform 38. A pinion 68 mounted on the inner end of the motor shaft meshes with and drives the gear 69 mounted on the outer end of the shaft 62.

A free passage or circulation of the sterilizing fluid around the cans as they are revolving in the sterilizer due to the rotation of the spider is secured by perforating the tubes 22, as indicated by the holes 70 in Fig. 12. When the cans to be sterilized have been fed into the sterilizer from the magazine 20 they are positively held in the tubes 22 until they are discharged from the sterilizer after sterilization. The means for holding the cans (indicated by the dotted lines 71 in Fig. 12) in the tubes during sterilization and until the sterilizer is in proper relation with the receiving magazine 21 comprises a series of stop fingers 73, there being one stop finger 73 located at the open end of each tube 22. Each row of stop fingers 73 is mounted on a shaft 74 journaled in the bosses 75 projecting from the bottoms of the tubes 22. The stop fingers are all articulated together so as to be operated simultaneously by means of a vertically disposed rod 76 pivotally connected with the rear ends of a series of arms 72 secured to and extending rearwardly from the shafts 74. The lowermost arm 77 is provided with a forwardly projecting part 78 adapted to be engaged by the arm 79 of a socket 80 fixed on the shaft 81 journaled in the bosses 82 depending from the under surfaces of the lowermost tubes. The socket 80 is adapted to receive a wrench 83 by which the stop fingers 73 are manipulated. The handle part of the wrench 83 is curved so that the active part of the wrench may be withdrawn from the socket 80 while the sterilizer is in close proximity to the receiving magazine 21 just previous to the discharge of the sterilized cans from the sterilizer into the receiving magazine.

After the cans have been fed into the sterilizer from the charging magazine 20, the arms 72 are turned in a clockwise direction by depressing the socket 80 to place the stop fingers 73 in front of the cans to prevent the cans from sliding out of the tubes while the sterilizer is being tilted into discharging position. It is considered desirable to put the stop fingers 73 into operative position while the sterilizer is still tilted upwardly, because at this time the cans are fully within the tubes and in position to permit the stop fingers to be swung up in front of the foremost cans in the tubes. The length of the tubes from the rear ends thereof to the stop fingers is such that when the appropriate number of cans have been introduced into the tubes the stop fingers are free to swing upwardly into operative position. If it were attempted to operate the stop fingers after the sterilizing operation and before the sterilizer is tilted downwardly, it might be that the cans had rolled forwardly and would thereby interfere with the placing of the stop fingers in operative position.

The sterilization of the contents of the cans in the sterilizer is conveniently effected by means of steam introduced into the sterilizer by a pipe 85 connected with a convenient source of supply not shown. The steam pipe 85 is located opposite substantially the middle of one side of the sterilizer and the inner end thereof is rotatably mounted in the upper end of the arms 86 supported from the pair of uprights 17. The connection 87 between the pipe 85 and the supporting arms 86 is such that the sterilizer 15 may tilt without turning the outer part of the pipe 85 in which part the valve 88 is located. From the connection 87 the pipe 85 turns downwardly at 89 and enters the bottom of the sterilizer by the connecting pipe 90. The steam is admitted to the sterilizer by turning the valve 88 and the act of sterilization is continued for the appropriate length of time depending upon the nature of the food products undergoing sterilization. The drain or discharge valve 92 is then turned by means of the handle 93 and the condensate is discharged into the sewer or elsewhere through the drain pipe 94. The discharge valve 92 is located in the middle of the bottom side of the sterilizer. The stem of the valve 92 is articulated with the stem of the handle 93 by means of the usual spanner connection 120.

In order that the discharge valve 92 may be disconnected from the drain pipe 94 when the sterilizer 15 is swung upwardly to can receiving position and downwardly to can discharging position, the discharge end of the valve 92 is provided with a pipe section 95 which terminates in a vertically arranged flange 96 adapted to make a tight connection with a similarly arranged flange 97 on the upper offset end 98 of the drain pipe 94. To lock the flanges 96 and 97 together a collar 100 loosely mounted on the inner end of the pipe section 98 is provided with a pair of upper and lower laterally extending fingers 101 the outer ends of which extend inwardly toward each other and overlap the recessed cam surfaces 102 of the flange 96. To the upper finger 101 is pivotally connected the upper end of a link 103, the lower end of which is pivotally connected with a rod 104 slidingly mounted in the bosses 105 rising from the table 19. The outer end of the rod 104 is pivotally connected with the lower end of an operating arm or handle 106 pivoted in an upright 107 rising from the table 19. When the fingers 101 are in the center of the cam recesses 102 the flange 96 is free to swing in either direction past the flange 97. When, however, the fingers 101 have been turned in either direction to cause the inturned ends thereof to travel up the tapered ends 108 of the recesses 102 the flanges are locked together in a tight joint.

To reduce the temperature of the cans after the condensate has been drained from the sterilizer, cold water is admitted to the sterilizer through the pipe 110 which has the same kind of a connection 111 with the upper end of the arms 112 supported from the uprights 18 which the pipe 85 has with the arms 86. The pipe 110 has two branches, the branch 114 entering the top of the sterilizer and the branch 115 entering the bottom of the rear end of the sterilizer. The branch 114 is controlled by the valve 116 and the branch 115 is controlled by the valve 117. Drainage of the condensate and of the cooling water from the sterilizer is facilitated by means of a trough 118 built into the bottom of the sterilizer and extending throughout the length thereof. All the while the steam for sterilizing the cans and the water for cooling the cans are turned on, the cans are caused to revolve in the sterilizer by means of the motor 67.

When the cans have become sufficiently cool the valves 116 and 117 are closed, and when all the cooling water has drained from the sterilizer the discharge valve 92 is closed. The clamps 55 are then released and the cover 44 slid into its inoperative position. The operator then tilts the forward end of the sterilizer downwardly into discharging position, having first removed the pin 35 and released the flanges 96 and 97. The magazine 21 having been moved into can receiving position with relation to the tilted sterilizer the operator inserts the wrench 83 into the socket 80 to turn the socket into normal position; thereupon the weight of the cans depresses the stop fingers 73 and the cans run down into the magazine 21.

The mode of operation of the improved sterilizing apparatus is briefly recapitulated as follows:—By removing the pin 35 the operator is enabled to tilt the sterilizer upwardly into can receiving position. He then moves the charging magazine forward until the lower end thereof is in close proximity to the upper open end of the sterilizer. This brings the tubes in the magazine 20 into alinement with the tubes 22 in the sterilizer. Thereupon the operator inserts his wrench into the socket 30 to rotate the plate 25 to bring the holes 26 therein into alinement with the tubes 24 and the tubes 22. When the sterilizer has received the charge from the magazine 20, the operator moves the magazine 20 out of the way and inserts the wrench 83 into the socket 80 so as to position the stop fingers 73 in front of the cans. The fingers 73 are locked in their can holding position by placing the end of the arm 79 of the socket 80 against the projection 78 of the arm 77, as indicated by the dotted lines in Fig. 13. The cover 44 is now slid into position over the open end of the sterilizer and fastened thereto by the clamps 55. The sterilizer is then tilted to its horizontal position, the pin 35 is inserted in its hole in the arm 40 and the projection 37, and the handle 106 is moved in either direction to lock the flanges 96 and 97 together.

The valve 88 may now be turned to admit steam to the sterilizer. Either before or after the opening of the valve 88 the motor 67 is started in operation to cause the can supporting spider to rotate in the sterilizer and so assure an equal distribution of the sterilizing medium through the interstices between the cans and thereby effect a uniform sterilization of the contents of the cans. When the sterilizing operation has been carried on for the requisite length of time, depending upon the nature of the food products undergoing sterilization, the valve 88 is closed and the drain or discharge valve 92 is opened by turning the handle 93, to discharge the condensate into the drain pipe 94. The valve 92 is then closed and the valves 116 and 117 are opened to admit cold water into the sterilizer. It is sometimes desirable to leave the drain valve 92 partially open when the valves 116 and 117 are opened to permit the heated water to flow into the drain pipe. The precise mode of operation to be followed will depend upon conditions. When the cans have become sufficiently cool the valves 116 and 117 are closed and the water is drained out of the sterilizer.

The sterilized cans are now in condition to be discharged into the receiving magazine 21. The pin 35 is removed, the handle 106 manipulated, the clamps 55 loosened and thrown back and the door or cover 44 slid into its inoperative position. The sterilizer is now tilted downwardly and the forward end of the receiving magazine is moved into close proximity with the open lower end thereof. The operator now inserts the wrench 83 into the socket 80 to disengage the end of the arm 79 from the projection 78, thereby permitting the cans to depress the stop fingers 73 and roll down into the magazine 21.

Having thus described the invention, what I claim as new is:—

1. A sterilizing apparatus comprising, a receptacle having a removable cover at one end, said receptacle being movable to one position to receive the articles to be sterilized and to another position to discharge the sterilized articles, means for introducing a sterilizing medium into the receptacle, a drain pipe having disengageable parts, means for locking the parts of the drain pipe together while the receptacle is in position for the sterilizing operation and for loosening the disengageable parts of the drain pipe when the receptacle is to be moved to its receiving position or to its discharging position.

2. A sterilizing apparatus comprising, a receptacle movable to one position to receive the articles to be sterilized and to another position to discharge the sterilized articles, means for introducing a sterilizing medium into the receptacle, a drain pipe having a section connected with the bottom of the receptacle, the free end of the pipe being provided with a vertically arranged flange, the second section of the drain pipe having a vertically arranged flange cooperating with the flange of the first section, cam surfaces on one of the flanges, and means for engaging the cam surfaces to lock the flanges together when the receptacle is in position for the sterilizing operation.

3. A sterilizing apparatus comprising, a receptacle mounted to occupy one position during the sterilizing operation and being movable to a second position to receive the articles to be sterilized, means for introducing a sterilizing medium into the receptacle, a drain pipe in two sections, one section of the drain pipe being connected with the bottom of the receptacle and having a vertically arranged flange on its free end, the second section of the drain pipe having a vertically arranged flange adapted to cooperate with the first flange, and locking means for permitting the flange of the first section to move past the flange of the second section when the receptacle is moved and for locking the flanges together while the receptacle is in position for the sterilizing operation.

4. A sterilizing apparatus comprising, a receptacle mounted to swing in a vertical plane, a removable cover for the front end of the receptacle, separable parts for holding the receptacle stationary in one position during the sterilizing operation and for permitting the receptacle to move to a second position for receiving the articles to be sterilized and to a third position for discharging the sterilized articles, means for introducing a sterilizing medium into the receptacle, and a drain pipe connected with the bottom of the receptacle, said drain pipe being in separable sections to permit the receptacle to move into its various positions.

5. A sterilizing apparatus comprising, a cylindrical receptacle mounted to swing in a vertical plane, a fixed cover on one end of the receptacle and a removable cover on the other end of the receptacle, separable parts for holding the receptacle stationary during the sterilizing operation and for permitting the receptacle to swing into article receiving and discharging positions, an article holding spider rotatably mounted in the receptacle, a shaft fixed in one end of the spider and journaled in the fixed cover of the receptacle, means carried by the receptacle for actuating the shaft, and means for introducing a sterilizing medium into the receptacle.

6. A sterilizing apparatus comprising, a cylindrical receptacle mounted to occupy one position during the sterilizing operation, and being movable to a second position to receive the articles to be sterilized and to a third position to discharge the sterilized articles, a fixed cover for one end of the receptacle and a removable cover for the other end of the receptacle, a platform extending outwardly from the fixed cover, a stationary member, means for securing the platform to the stationary member during the sterilizing operation, a rotatable spider mounted in the receptacle, a shaft journaled in the fixed cover and having its inner end fixed in one end of the spider, a gear mounted on the other end of the shaft, a motor mounted on the platform and having a driving connection with the gear, and means for introducing a sterilizing medium into the receptacle.

7. A sterilizing apparatus comprising, a cylindrical receptacle, a pair of horizontally disposed trunnions fixed in the middle points of the sides of the receptacle to permit the receptacle to swing in a vertical plane, means for supporting the trunnions, a fixed cover for the rear end of the receptacle, a frame work connected with the front end of the receptacle, a movable cover for the front end of the receptacle mounted to slide on the frame work into and out of operative position, a spider rotatably mounted in the receptacle, a platform projecting from the fixed cover, a stationary member, means for securing the platform to the stationary member during the sterilizing operation, means carried by the platform for driving the spider, and means for introducing a sterilizing medium into the receptacle.

8. A sterilizing apparatus comprising, a cylindrical receptacle, a can holding spider located in the receptacle and consisting of a series of longitudinally disposed tubes, transversely arranged plates in which the tubes are fixed to rotate in the receptacle, a fixed cover for one end of the receptacle, a shaft journaled in the fixed cover and having one end fastened to the spider, means for actuating the shaft, means for supporting the receptacle so that it may be moved to one position to receive the cans to be sterilized and to another position to discharge the sterilized cans, and means connected with the tubes for holding the cans therein until the receptacle is in discharging position.

9. A sterilizing apparatus comprising, a cylindrical receptacle, a rotatable can holding spider located in the receptacle and consisting of a series of longitudinal tubes, and a series of plates in which the tubes are fixed having a bearing on the inner surface of the receptacle, a fixed cover for the rear end of the receptacle, a removable cover for the front end of the receptacle, a shaft journaled in the fixed cover for turning the spider, means for actuating the shaft, and means for introducing a sterilizing medium into the receptacle.

10. A sterilizing apparatus comprising, a cylindrical receptacle mounted to swing on a vertical plane, said receptacle occupying one position during the sterilizing operation, a second position for receiving the articles to be sterilized, and a third position for discharging the sterilized articles, a spider rotatably mounted in the receptacle and consisting of a series of tubes for holding the articles, and a series of plates having a bearing against the inner surface of the receptacle, means connected with the front ends of the tubes for holding the articles therein while the receptacle is being moved to discharging position, and means for introducing a sterilizing medium into the receptacle.

11. A sterilizing apparatus comprising, an elongated cylindrical receptacle, open at one end to receive and discharge the articles therethrough, a cover for closing the open end of the receptacle, a series of tubes rectangular in cross-section located in the receptacle and extending throughout substantially the length thereof and adapted to hold cylindrical cans, the walls of said tubes being perforated to permit of the circulation of the sterilizing medium therethrough, means for rotatably supporting the tubes as a whole in the receptacle, means connected with the tubes for rotating them, and means for introducing fluid into the receptacle.

BURT E. TAYLOR.